3,033,890
PREPARATION OF PHOSPHORUS CHLORINE CONTAINING COMPOUNDS
William M. Le Suer, Cleveland, Ohio, assignor to The Lubrizol Corporation, Wickliffe, Ohio, a corporation of Ohio
No Drawing. Filed Sept. 4, 1959, Ser. No. 838,024
10 Claims. (Cl. 260—461)

This invention relates to novel compositions of matter and to the process by which such compositions may be prepared conveniently. In a more particular sense it relates to a process of preparing phosphorus- and chlorine-containing compositions.

The use of small amounts of chemicals in lubricating compositions for the purpose of improving the properties of those lubricating compositions has become quite widespread, and among the most important of such chemicals are those which contain unusually large amounts of metal. Such metal-containing additives have been found to be very useful for example as dispersants in crankcase lubricants, and to a certain extent at least such usefulness is related directly to the relative amounts of metal present in the additive. Such additives have a marked effect upon the overall properties of the lubricant to which they are added and act to impart a high degree of detergency, i.e., they prevent the deposition of foreign particles and maintain such particles in suspension in the lubricant.

The availability of these metal-containing additives depends almost entirely upon an organic dispersing agent such as a normal metal sulfonate or a metal phenate. Many of these organic dispersing agents, including sulfonates, phenates, carboxylates and phosphorus acid salts have been prepared and all have been found to be useful, some more useful than others. It is not unexpected that some of these organic anions are capable of sustaining in suspension a larger amount of ordinarily oil-insoluble metal than others, and in this respect those organic anions which have the greater potential in this respect are the more valuable. Thus a metal sulfonate which can solubilize six or eight equivalents of ordinarily oil-insoluble metal is obviously more valuable than a metal carboxylate which can solubilize only one or two equivalents of the same ordinarily oil-insoluble metal.

One of the objects of this invention is the preparation of an organic acidic material for use in the preparation of such metal-containing additives as are described above.

Another such object of this invention is the preparation of an organic acidic material as indicated above, which contains phosphorus and chlorine.

Still another object of the invention is to provide a process by which such phosphorus- and chlorine-containing composition can be made available.

It is also an important object of this invention to provide an organic acidic material the salts of which are capable of sustaining the suspension in oil of relatively large amounts of ordinarily oil-insoluble metal.

These and other objects have been achieved by the process of preparing phosphorus- and chlorine-containing compositions which comprises the steps of mixing a chlorinated olefin polymer having a chlorine content of from about 0.2 to about 20% with from about 0.2 to about 20 equivalents of an aromatic phosphorochloridite and heating the resulting mixture to a temperature within the range of from about 125° C. to about 250° C.

The products which are available from the above process are in general clear, brown, viscous liquids. They can be filtered without difficulty and they are completely miscible with mineral oil. They contain significant amounts of phosphorus and chlorine and they are susceptible of further reaction with reagents which act to remove a portion of the chlorine. The principal reagent which has been used to so modify these products is water, particularly steam. Treatment with steam converts such a phosphorus- and chlorine-containing material to an acid, and this acid can in turn be neutralized to form a metal salt. This metal salt is especially valuable as a motor oil dispersant in itself, and as a starting material in the preparation of a motor oil dispersant which contains very large amounts of ordinarily oil-insoluble metal.

The reaction conditions of the process of this invention involve as indicated a temperature within the range of from about 125° C. to about 250° C. In most cases a suitable reaction temperature is 200° C. Occasionally it is necessary to employ higher temperatures below the decomposition point of the components of the reaction mixture, and likewise in some cases the process may be carried out quite satisfactorily, though perhaps a bit more slowly, at temperatures in the neighborhood of the lower limit of this stated range, i.e., about 125° C. The progress of the reaction can be followed by noting the evolution of hydrogen chloride from the reaction mixture. The initial evolution of hydrogen chloride usually begins immediately, even before the temperature of the process mixture has reached the desired range. The reaction is continued then until there is no more appreciable evolution of hydrogen chloride. When this point is reached, in most cases it is well to continue the reaction for as much as 20 hours to insure its completion. As a general statement then it may be said that the reaction time of the process is from about 5 to about 20 hours.

The chlorinated olefin polymer and aromatic phosphorochloridite may be mixed in any fashion, either may be added to the other, portionwise or all at once. The mixture may be prepared at room temperature and then heated to reaction temperature, or the one reactant may be heated to reaction temperature followed by addition of the other reactant, again either portionwise or all at once.

An important embodiment of the invention involves the in situ formation of the aromatic phosphorochloridite reactant. Thus the chlorinated olefin polymer may be mixed with the precursors of a particular aromatic phosphorochloridite and this resulting mixture heated to reaction temperature. In such a case the precursors react to form the expected aromatic phosphorochloridite and this latter product in turn reacts with the chlorinated olefin polymer according to the process of this invention. The "precursors" are phosphorus trichloride and a phenolic compound. This particular embodiment is preferred over that in which the aromatic phosphorochloridite reactant is prepared first and then added as such to the process mixture. In either case the product is identical so that there is no advantage attached to the separate preparation and isolation of an aromatic phosphorochloridite.

The separate preparation of such aromatic phosphorochloridites is illustrated by the following examples.

EXAMPLE A

To 3105 grams (22.5 moles) of phosphorus trichloride with stirring at 60–85° C. there was added throughout a period of 2.5 hours 3060 grams (15 moles) of heptyl phenol. The mixture was heated at reflux (110–131° C.) for an additional 8 hours and then concentrated by heating to 117° C./0.3 mm. The residue was a clear, light brown liquid having a pungent odor. It was identified as heptylphenyl phosphorodichloridite by the following analyses.

Percent P _____ 9.2
Percent Cl _____ 20.7

EXAMPLE B

Phenyl phosphorodichloridite and diphenyl phosphorochloridite were prepared as follows. To 1510 grams (11 moles) of phosphorus trichloride there was added with stirring at 15–30° C. 940 grams (10 moles) of phenol. The addition was made portionwise over a period of 2 hours. The mixture was heated for an additional 4 hours at about 127° C. and then at 100° C./30–40 mm. The residue was fractionated into two principal distillates. The first boiled at 100–130° C./20–30 mm. and was identified by analysis (P: 15.6%, Cl: 34.7%) as phenyl phosphorodichloridite. The second fraction boiled at 110–130° C./0.1–0.2 mm. and was identified by analysis (P: 11.9%, Cl: 14.1%) as diphenyl phosphorochloridite. Each was a clear, water-white liquid.

Another very useful embodiment of the invention also involves in situ formation of the aromatic phosphorochloridite reactant. In this particular instance an excessive amount of phosphorus trichloride is used in the preparation of this reactant and it is believed that the excess phosphorus trichloride, i.e., over and above that which reacts with the phenolic compound, reacts with the chlorinated olefin polymer. Thus in this embodiment of the invention the chlorinated olefin polymer reacts with both the aromatic phosphorochloridite and also with phosphorus trichloride. This latter reaction is discussed in some detail in copending application Ser. No. 808,903, filed April 27, 1959.

The chlorinated olefin polymer reactant is illustrated specifically by a chlorinated polyisobutylene in which the polyisobutylene has an average molecular weight of 750 and which after chlorination contains about 5% of chlorine. Olefins other than isobutylene have been used in the preparation of this particular reactant and polymers of widely varying molecular weights likewise have been found to be satisfactory for use in the process. Copolymers have also been found to be useful in this process and these likewise can have molecular weights within a wide range. Polymers of molecular weights as low as about 150–200 are useful and at the other end of the scale polymers having molecular weights as high as 50,000 have been found satisfactory. Inasmuch as the principal utility of the products of the present process has thus far been found to reside in their role as materials for use in the preparation of lubricant additives a particularly preferable range of molecular weight is that which provides maximum oil-solubility to the end product. This is a range of molecular weight of from about 350 to about 2000 and accordingly the greatest use of the process involves olefin polymers of molecular weights within this range.

As mentioned before the olefin polymer ordinarily is a polyisobutylene. Polyethylene, polypropylene and polyamylenes are also contemplated within the scope of useful homopolymers. Copolymers have also been used with success and all such copolymers which are substantially aliphatic in nature likewise are within the scope of this invention. The composition of such copolymers must be predominantly aliphatic, i.e., at least 75% (on a molar basis) of the monomeric units should be aliphatic.

Other monomeric units include styrene, substituted styrenes, etc. Polyisoprene and polybutadiene likewise are useful as are copolymers of isoprene and butadiene.

The aromatic phosphorochloridite reactant may have either of these structures where X is oxygen or sulfur and Ar is an aromatic radical

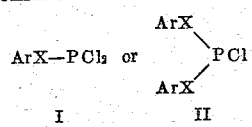

I above is a phosphorodichloridite whereas II is the phosphoromonochloridite, referred to simply as a phosphorochloridite. It will be noted that this latter expression is both generic and specific. As indicated earlier these compounds can be prepared by the reaction of a phenolic compound with phosphorus trichloride, and they can be prepared separately or in situ in the reaction of this process. The aromatic group of this reaction is derived from the phenolic precursors thereof and is in most cases an alkylaryl group such as alkylphenyl. It may alternatively be phenyl or naphthyl or the many substituted derivatives of these radicals. These latter include principally the halogen-substituted phenyl or naphthyl radicals such as chlorophenyl, dichlorophenyl, chloronaphthyl, dichloronaphthyl, etc. Again, because of the principal utility of the products as additives in lubricants, the preferred aromatic groups are those derived from alkyl phenols. These include butylphenyl, hexylphenyl, octylphenyl, decylphenyl, dodecylphenyl, hexadecylphenyl and eicosylphenyl radicals.

The chemical structure of the product of this process does not appear to be susceptible of characterization. It is believed to comprise a structure which upon hydrolysis results in the formation of a mixture of organic acids. The reaction of the process of the invention is known to be accompanied by the evolution of substantial amounts of hydrogen chloride and it is presumed that this hydrogen chloride results from the splitting out of a hydrogen atom from the chlorinated olefin polymer and a chlorine atom from the aromatic phosphorochloridite. This would result of course in the formation of a carbon-phosphorus bond and it is believed that at least one of the principal products of the process contains such a carbon-phosphorus bond.

Subsequent hydrolysis of this product (the product of the process of this invention) appears to result in the formation of a substantial proportion of a dibasic phosphorus acid.

The above discussion of structure is merely speculative. The basis for such speculation is the observation that the phenolic radical remains in the product of the process of this invention, but can be removed from the product mixture which results from the hydrolysis of this product; and upon data acquired from titration studies (as regards the dibasic nature of the acid hydrolysates).

As mentioned before the principal uses of the products of this invention are as intermediates for the preparation of lubricant additives which serve as dispersants in crankcase oils. The further reaction of these intermediates involves hydrolysis, resulting in a formation of acidic material which can then be neutralized with an excessive amount of a basic metal compound to form such dispersants. This hydrolysis is best effected by means of treatment with steam, but it may also be accomplished by adding an excessive amount of water and heating. In some particular cases the products of this invention may be treated with such chlorine-reactive agents as alcohols or phenols to produce materials which are useful for particular applications.

The process is illustrated in more detail by the examples which follow.

*Example 1*

A mixture of 800 grams (1.0 mole) of chlorinated polyisobutylene having an average molecular weight of 800 and a chlorine content of 4.7%, and 253 grams (1.0 mole) of diphenyl phosphorochloridite was prepared and heated to 160° C. The evolution of hydrogen chloride was observed at this point and throughout the ensuing period of 17.5 hours while the temperature was raised gradually to 205° C. The residue was then heated at 225° C./0.4 mm., yielding 765 grams of a viscous, dark brown liquid residue. Upon analysis it showed Percent P _____ 1.4
Percent Cl _____ 0.4

*Example 2*

A mixture of 405 grams (2.0 moles) of monochlorotriisobutylene and 336 grams (1.0 mole) of heptylphenyl phosphorodichloridite was prepared and heated for 15 hours at 155–222° C. The evolution of hydrogen chloride was measured in terms of the loss in weight of the reaction mixture and the total of such loss was 66 grams. The mixture then was heated at 212° C./0.2 mm., yielding 227 grams of a dark brown liquid viscous residue. This product had the following analyses.

Percent P _____ 6.0
Percent Cl _____ 3.9

Example 3

To 800 grams (1.0 mole) of chlorinated polyisobutylene having a molecular weight of 800 and a chlorine content of 4.7% there was added 245 grams (1.0 mole) of beta naphthyl phosphorodichloridite. This mixture was heated for 13.5 hours at 180–225° C., a weight loss of 88 grams (of the reaction mixture) being observed throughout this period. The mixture then was heated at 233° C./0.6 mm. leaving 913 grams of a dark brown, very viscous liquid residue. This product showed the following analyses.

Percent P _____ 2.4
Percent Cl _____ 0.4

Example 4

A mixture of 1000 grams (.0057 mole) of a 20% oil solution of a chlorinated polyisobutylene having an average molecular weight of 35,000 and a chlorine content of 0.4%, and 19.2 grams (0.057 mole) of heptylphenyl phosphorodichloridite was prepared and heated for 15.5 hours at 190–235° C. A net loss in weight of 9 grams was observed during this period of heating. The mixture then was heated at 163° C./0.01 mm. The residue, weighing 918 grams, was a dark brown, viscous liquid having the following analyses.

Percent P _____ 0.15
Percent Cl _____ 0.2

Example 5

A mixture of 400 grams (0.04 mole) of a chlorinated polyisobutylene having an average molecular weight of 10,000 and a chlorine content of 2.0% and 58 grams (0.23 mole) of tert-butylphenyl phosphorodichloridite was heated for 5 hours at 211–228° C. The mixture then was heated to 244° C./1.5 mm. leaving a dark, reddish brown, viscous residue having the following analyses.

Percent P _____ 1.0
Percent Cl _____ 0.2

Example 6

A mixture of 200 grams (0.5 mole) of chlorinated polyisobutylene having an average molecular weight of 384 and a chlorine content of 9.2%, and 174 grams (0.5 mole) of heptylphenyl phosphorodichloridite was heated for 5.5 hours at 195–220° C. The mixture then was heated to 202° C./1.8 mm. The residue was a reddish brown, slightly viscous material having the following analyses.

Percent P _____ 4.3
Percent Cl _____ 0.9

Example 7

A mixture of 86 grams (0.26 mole) of heptylphenyl phosphorodichloridite and 300 grams (0.26 mole) of a chlorinated 95:5 (by weight) copolymer of isobutylene and styrene having an average molecular weight of 1,170 and a chlorine content of 3.0% was heated for 5 hours at 210–225° C. The evolution of hydrogen chloride was evident throughout this period. The mixture then was heated to 220° C./3.5 mm. The residue was a reddish brown, very viscous material having the following analyses.

Percent P _____ 1.6
Percent Cl _____ 1.3

Example 8

A mixture of 400 grams (0.15 mole) of a chlorinated polyethylene having an average molecular weight of 2,650 and a chlorine content of 2.1%, and 79 grams (0.24 mole) of heptylphenyl phosphorodichloridite was heated for 5.5 hours at 196–227° C. The mixture then was heated to 215° C./1.2 mm. The residue was a brown, waxy solid having the following analyses.

Percent P _____ 1.1
Percent Cl _____ 1.5

Example 9

To 46 grams (0.14 mole) of heptylphenyl phosphorodichloridite there was added 314 grams (0.01 mole) of a chlorinated 99:1 copolymer of isobutylene and isoprene having an average molecular weight of 2,840 and a chlorine content of 1.54%. This mixture was heated for 5.5 hours at 200–225° C. The mixture then was heated to 210° C./10 mm. The residue was a brown solid showing the following analyses.

Percent P _____ 0.9
Percent Cl _____ 0.8

Example 10

A mixture of 427 grams (0.48 mole) of a chlorinated polypropylene having an average molecular weight of 850 and a chlorine content of 4.0%, and 161 grams (0.48 mole) of heptylphenyl phosphorodichloridite was heated for 5 hours at 205–225° C. The mixture was heated then to 225° C./2.5 mm. The residual reddish brown, viscous liquid had the following analyses.

Percent P _____ 2.1
Percent Cl _____ 1.1

Example 11

A mixture of 191 grams (0.25 mole) of a chlorinated polyisobutylene having an average molecular weight of 762 and a chlorine content of 4.7%, and 49 grams (0.25 mole) of phenyl phosphorodichloridite was heated for 6 hours at 166–175° C. The mixture then was heated to 176° C./1.1 mm. The residue was a reddish brown, viscous liquid with the following analyses.

Percent P _____ 2.2
Percent Cl _____ 1.4

Example 12

A mixture of 200 grams (0.24 mole) of chlorinated polyisobutylene having an average mloecular weight of 838 and a chlorine content of 4.3%, and 46.5 grams (0.24 mole) of phenyl phosphorodichloridite was heated for 6 hours at 136–143° C. The mixture then was heated to 145° C./.15 mm. The residue was a reddish brown, slightly viscous material having the following analyses.

Percent P _____ 1.4
Percent Cl _____ 3.1

Example 13

A mixture of 780 grams (1.0 mole) of chlorinated polyisobutylene having an average molecular weight of 780 and a chlorine content of 4.7%, and 7.8 grams (0.2 mole) of 2,2'-thiobis(4-methyl-6 tert-butyl phenol) was prepared and heated to 165° C. To this mixture there was added portionwise throughout a period of 3 hours 138 grams (1.0 mole) of phosphorus trichloride. The temperature of the reaction mixture was maintained within the range of 165–200° C. throughout this period, and then at 190–205° C. for an additional 9 hours. The mixture then was heated to 190° C./20 mm. The residue was diluted by the addition of 375 grams of mineral oil and then treated with steam for 1 hour at 160–165° C. This steam-treated material then was dried by heating to 190° C./20 mm., and filtered through a siliceous filter aid while hot. The filtrate was a reddish brown viscous material having the following analyses.

Percent P _____ 1.7
Percent Cl _____ 0.3

*Example 14*

A formaldehyde-phenol condensation product was prepared by the reaction of 1.5 moles of formaldehyde and 1.0 mole of diisobutyl phenol at 90° C. in the presence of an ammonium hydroxide catalyst. A mixture of 7.8 grams (0.2 mole) of this condensation product and 780 grams (1.0 mole) of chlorinated polyisobutylene having an average molecular weight of 780 and a chlorine content of 4.7% was prepared and heated to 165° C. At this point 138 gram (1.0 mole) of phosphorous trichloride was added portionwise throughout a period of 5 hours, the temperature being maintained at 160–193° C. The mixture then was heated at 190–200° C. for an additional 14 hours and then at 168° C./20 mm. The residue was diluted by the addition of 375 grams of mineral oil and then blown with steam for 1 hour at 135–175° C. The last traces of moisture were removed by heating to 183° C./20 mm. The residue was filtered while hot, through a siliceous filter aid. The filtrate was a reddish brown, viscous liquid having the following analyses.

Percent P _____ 1.7
Percent Cl _____ 0.2

*Example 15*

To 1000 grams (1.2 mole) of a chlorinated polyisobutylene having an average molecular weight of 783 and a chlorine content of 4.3% there was added at 100° C. 205 grams (1.5 mole) of phosphorus trichloride. To this mixture there was then added 61.5 grams (0.3 mole) of heptylphenol. This addition was made portionwise throughout a period of 2 hours. The resulting mixture was heated for an additional 3 hours at 80° C. and then for 2 hours at 190° C. Nitrogen was blown through the mixture for 30 minutes. To 2000 grams of this product there was added 54 grams of methanol at 53° C. An exothermic reaction ensued. The mixture was heated at 53–85° C. for 1.6 hours whereupon an additional 100 grams of methanol was added portionwise throughout a period of 1 hour, the temperature being maintained at 86–100° C. The mixture was heated at reflux for 3 hours and then methanol distilled from the mixture, allowing the temperature to rise to 190° C. during a period of 10 hours. This temperature was maintained for an additional 2.5 hours whereupon the mixture was heated at 190° C./30 mm. The residue was a reddish brown, viscous material having the following analyses.

Percent P _____ 2.0
Percent Cl _____ 0.3

*Example 16*

A chlorinated polyisobutylene-heptyl phenol-phosphorus trichloride reaction product was prepared as in the preceding example except equimolar amounts of these three reactants were employed. A mixture of 933 grams of such a product and 100 grams (0.42 mole) of heptyl phenol was heated at 218–227° C. for 5.5 hours. The residue was heated at 225° C./0.4 mm. The material then was filtered through a siliceous filter aid while hot. The filtrate was a reddish brown, viscous liquid having the following analyses.

Percent P _____ 1.9
Percent Cl _____ 0.04

*Example 17*

A mixture of 500 grams (0.64 mole) of chlorinated polyisobutylene having a chlorine content of 4.5% and an average molecular weight of 780, and 70 grams (0.64 mole) of thiophenol was prepared and heated to 71° C. To this mixture there was added 108 grams (0.64 mole) of phosphorus trichloride, thereby causing the temperature to drop to 51° C. The mixture was heated for one hour at 55–65° C., then to 188° C. during a period of 1.2 hours and finally for 4.5 hours at 188–202° C. The product mixture was heated to 185° C./35 mm., 30 grams of distillate being collected during this last heating step. The residue was a dark reddish brown, viscous liquid having the following analyses.

Percent P _____ 3.1

The above example illustrates the use of a thiophenol in the process of this invention. Alkylated thiophenols are useful also in the process of this invention.

The particular utility of the compositions prepared by the process of this invention is as indicated, for use in the preparation of lubricant additives. To illustrate specifically such use, an intermediate product prepared as in Example 15, up to the point at which methanol is added (and immediately after the step of blowing with nitrogen) was blown with steam at 175–195° C. until the neutralization number had leveled off at about 50. To a mixture of 700 grams of mineral oil, 18 grams of water and 27 grams (0.35 equivalent) of barium oxide at 80° C. there is added 171 grams (0.15 equivalent) of the above acidic product. Eleven grams (0.06 equivalent) of heptyl phenol is added and the mixture heated for an additional hour at 85° C. Then 113 grams (1.47 equivalents) more of barium oxide is added. After another hour of heating carbon dioxide is blown through the mixture for 6 hours and then nitrogen for 30 minutes. The mixture is diluted with 118 grams of mineral oil and filtered through a siliceous filter aid. The filtrate will show a barium content of about 26% as sulfate ash.

The efficacy of the above barium-containing product as a lubricant additive can be shown by the results of an engine test carried out in accordance with U.S. Army Ordnance Tentative Specification AXS–1551. This test is known as the caterpillar CRC–L–1 engine test and the particular test to which this barium-containing product is to be subjected is a modification of that engine test. The modification consists of the use of a fuel having a sulfur content of 1% (significantly higher than that of the specified fuel). The test period is 240 hours and the above product is tested at 2.3% concentration (by weight) in a mineral lubricating oil. At the conclusion of the test period the "ring filling" value and the "piston cleanliness" rating are noted. The above barium-containing product shows up well in this test.

Other such lubricant additives which contain stoichiometrically large amounts of metal can be prepared similarly. It is necessary only to hydrolyze the products of the process of this invention usually with steam, and then to treat them with a stoichiometrically excessive amount of an inorganic basically reacting metal compound in the presence of a promoter. The basically reacting metal compound generally is an alkaline earth metal compound. These latter include specifically barium oxide, barium hydroxide, calcium oxide, calcium hydroxide, as the most useful of these basic metal compounds. The "promoters" are usually phenolic compounds, generally alkylated phenols. Other types of phenolic compounds are also useful. Alcohols are also commonly used as promoters in the preparation of these particular lubricant additives. Still other types of promoters are aliphatic nitro compounds such as nitropropane, nitrated paraffin wax and other compounds which contain an aliphatic aci-nitro group; and oximes such as acetone oxime.

In most cases the hydrolyzed product of the process of this invention is treated with the indicated amount of a basic metal compound in the presence of a promoter, and then before filtering, the process mixture is blown with carbon dioxide until it is substantially neutral.

As for the relative amounts of the basic metal compound and promoter, it is necessary only to use a stoichiometric excess of the basic metal compound with respect to the amount of acidic reactant derived from the process of this invention, and to use an amount of promoter ranging from about 0.2 mole to about 10 moles with respect to the amount of this acidic reactant.

The products of the process of this invention are useful in other applications also. Another of such applications is in the field of insecticides where these products are useful in combatting the red spider mite. An illustration of such utility is the use of a 10% solution in kerosene of the product of Example 6 in preparing an aqueous emulsion which can be applied to the growing insects. This emulsion is prepared by mixing 10 parts of the kerosene solution, 100 parts of water and 1 part of diamyl phenol-propylene oxide condensation product containing about six propylene oxide units. The resulting emulsion then is sprayed directly onto vegetation infested with the red spider mites.

Other modes of applying the principle of the invention may be employed, change being made as regards the details described, provided the features stated in any of the following claims or the equivalent of such be employed.

I therefore particularly point out and distinctly claim as my invention:

1. The process of preparing phosphorus- and chlorine-containing compositions which comprises the steps of mixing a chlorinated substantially aliphatic polymer of a lower olefin said polymer having a molecular weight within the range of from about 150 to about 50,000 and having a chlorine content of from about 0.2 to about 20%, with from about 0.2 to about 20 equivalents of an aromatic phosphorochloridite selected from the group consisting of phenyl, naphthyl, halogen substituted and alkyl-substituted phenyl and halogen-substituted and alkyl-substituted naphthyl phosphorochloridites, and heating the resulting mixture to a temperature within the range of from about 125° C. to about 250° C.

2. The process of claim 1 characterized further in that the chlorinated olefin polymer has an average molecular weight within the range of from about 350 to about 2000.

3. The process of claim 1 characterized further in that the time of heating the process mixture is from about 5 to about 20 hours.

4. The process of claim 1 characterized further in that the aromatic phosphorochloridite is an aromatic phosphorodichloridite.

5. The process of claim 1 characterized further in that the aromatic phosphorochloridite is an alkylphenyl phosphorodichloridite.

6. The process of preparing phosphorus- and chlorine-containing compositions which comprises the steps of mixing a chlorinated isobutylene polymer having a chlorine content of from about 2 to about 6% with from about 0.5 to about 2 equivalents of an aromatic phosphorodichloridite selected from the group consisting of phenyl, naphthyl, halogen substituted and alkyl-substituted phenyl and halogen-substituted and alkyl-substituted naphthyl phosphorodichloridites, and heating the resulting mixture to a temperature within the range of from about 125° C. to about 250° C.

7. The process of claim 6 characterized further in that the chlorinated isobutylene polymer has an average molecular weight of from about 350 to about 2000.

8. The process of claim 6 characterized further in that the chlorinated isobutylene polymer is a chlorinated homopolymer of isobutylene.

9. The process of preparing phosphorus- and chlorine-containing compositions which comprises the steps of mixing a chlorinated polyisobutylene having a chlorine content of from about 2 to about 6% and an average molecular weight of from about 350 to about 2000, with from about 0.5 to about 2 equivalents of heptylphenyl phosphorodichloridite and heating the resulting mixture to a temperature within the range of from about 125° C. to about 250° C. for at least 5 hours.

10. The process of preparing phosphorus- and chlorine-containing compositions which comprises the steps of mixing a chlorinated substantially aliphatic polymer of a lower olefin, said polymer having a molecular weight within the range of from about 150 to about 50,000 and having a chlorine content of from about 0.2 to about 20%, with from about 0.2 to about 20 equivalents of an aromatic phosphorochloridite selected from the group consisting of phenyl, naphthyl, halogen substituted and alkyl-substituted phenyl and halogen-substituted and alkyl-substituted naphthyl phosphorochloridites, and heating the resulting mixture to a temperature within the range of from about 125° C. up to a temperature below the decomposition point of the components of the process mixture.

References Cited in the file of this patent
UNITED STATES PATENTS

| | | |
|---|---|---|
| 2,711,403 | Stiles et al. | June 21, 1955 |
| 2,724,718 | Stiles et al. | Nov. 22, 1955 |
| 2,829,137 | Yolles | Apr. 1, 1958 |
| 2,860,155 | Walsh | Nov. 11, 1958 |